Oct. 22, 1963 R. R. TERRELL 3,107,927

MEMORANDA DEVICE

Filed July 9, 1962

INVENTOR.
RAY R. TERRELL

BY Toulmin & Toulmin

ATTORNEYS

United States Patent Office 3,107,927
Patented Oct. 22, 1963

3,107,927

MEMORANDA DEVICE

Ray R. Terrell, 2 W. Columbia St., Springfield, Ohio

Filed July 9, 1962, Ser. No. 208,334
13 Claims. (Cl. 281—6)

This invention relates to a device for keeping memoranda and is particularly concerned with such a device especially constructed and adapted for use with French type telephones.

The usual type telephone, for both office and domestic purposes, is the so-called French type 'phone, which consists of a base portion that will rest on a desk or table and on which is cradled the combination transmitter receiver. Telephones of this nature have a finger hole immediately behind the position in which the transmitter receiver is cradled, so that the base of the telephone can be picked up and moved about if desired.

Telephones of this nature also comprise a generally horizontal surface extending forwardly from the finger hole beneath the cradle of the telephone and then on down the face of the base of the telephone.

The present invention is particularly concerned with an arrangement for supporting a roll of paper so that the end of the roll of paper can be disposed on the aforementioned horizontal surface and information written thereon, such as short memoranda or telephone numbers.

The present invention also proposes the provision of a holder for a roll of paper, which holder will engage the aforementioned finger hole and be retained thereby, and from which holder a strip of paper can be fed so as to be drawn over the generally horizontal surface on the top of the telephone base.

The present invention also proposes a guide and tear off member arranged for being retained on the telephone base adjacent the said horizontal surface over which the strip of paper moves, so that the paper can be torn off readily, and so that the tear off member does not interfere with the manipulation of the telephone in any way.

It is also proposed by the present invention to provide a holder for a roll of paper, which is inexpensive and which is easily assembled with the telephone or removed therefrom, and which can readily be opened for inserting a new paper roll.

Still further, the present invention proposes the combination of a paper roll holder of the nature referred to, together with a writing instrumentality, so that both thereof can be associated with the telephone, and including means for retaining refill elements for the writing instrument.

Still further, the present invention proposes to provide a holder for paper rolls and the like which can be made of plastic material or a colored metal material, and which can be made to match the color of the telephone, if so desired, and which in configuration may correspond partly with the configuration of the telephone and which will not project into the telephone an objectionable amount.

The exact nature of the present invention will be more fully comprehended upon reference to the following specification taken in connection with the accompanying drawings wherein.

Figures 1, 2, 3, 5:
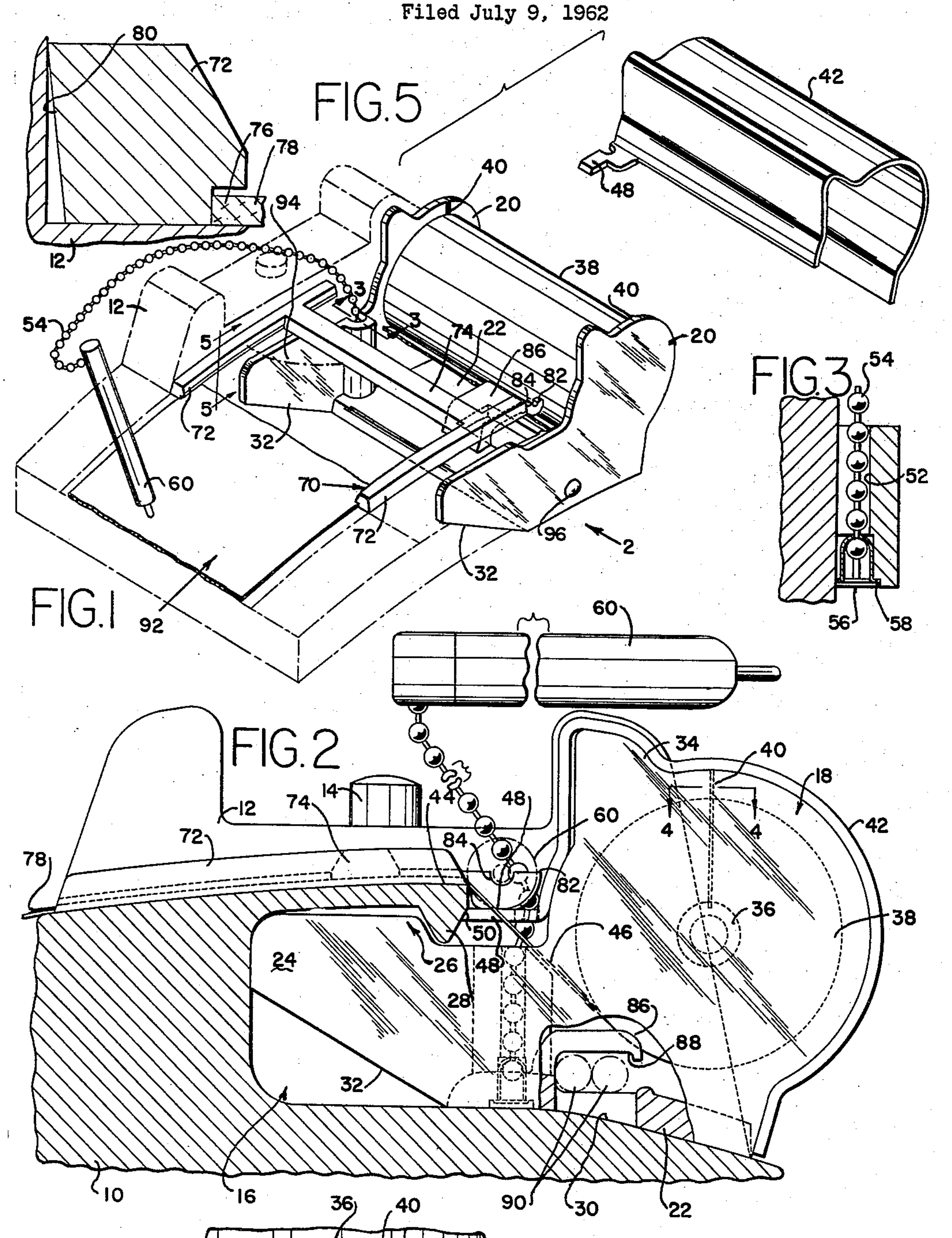
FIGURE 1 is a somewhat diagrammatic partially perspective view showing a device according to the present invention, partly disassembled and associated with a telephone which is shown in phantom outline.
FIGURE 2 is a side view of the device of the present invention looking in the direction of the arrow 2 of FIGURE 1 and showing the telephone in cross section.
FIGURE 3 is a vertical sectional view indicated by line 3—3 on FIGURE 1 showing the manner in which a writing instrument is detachably retained on the device.
FIGURE 5 is a sectional view indicated by line 5—5 on FIGURE 1.

Referring to the drawings somewhat more in detail, and particularly with reference to FIGURES 1 and 2, the telephone set, shown somewhat diagrammatically therein, consists of a base 10, and upstanding from opposite sides of the base are cradle portions 12 for receiving the telephone transmitter and receiver. As is known when the receiver is cradled on the base the buttons 14 are depressed, thereby to interrupt the circuit to the receiver transmitter.

A telephone of the type illustrated and which is referred to as a French type telephone has a finger hole or recess 16 extending into the back thereof intermediate and beneath the aforementioned cradle portions 12.

According to the present invention this finger hole or recess is availed of for retaining a holder for a strip of paper so that paper is available at the telephone at all times for jotting down notations, such as short messages, or telephone numbers, or the like.

The holder, according to the present invention, comprises a main frame portion 18 which has upstanding end members 20. Extending between these end members and integrally connected therewith is transverse rail means 22.

The end members and the transverse rail means form a substantially rigid unit that is, of course, self supporting and which is quite strong. For example, the end members might be somewhat less than ⅛ of an inch in thickness, and the transverse rail means might be even somewhat thicker than ⅛ of an inch. For most plastic materials this would be a sufficient thickness, and if made of metal, such as anodized aluminum, or the like, it could be thicker.

The side members 20, as viewed in FIGURE 2, are formed, at the left, so that they can be received within the aforementioned finger hole or recess 16. To this end the side members 20 comprise the parts 24, each of which has at its upper edge an upstanding portion 26 that is receivable in the upper part of recess 16 between the bottom wall thereof and the dependent ridge 28 extending across the outer or open end of the recess.

Along the bottom the side members 20 and transverse rail means 22 are so shaped that they conform to the configuration of the upper surface 30 of the telephone from the recess or finger hole rearwardly.

It will be evident that the device may be tilted when the portions 24 of the end members are placed into or removed from the finger hole or recess, and to this end the portions 24 of the side members are beveled off at 32 within the recess to permit the aforementioned tilting movement.

Each side member at its right end, as viewed in FIGURE 2, is disk-like in configuration except for an upwardly projecting portion at 34, which conforms generally in configuration to the rear part of the cradle portion 12 of the telephone.

Each side member also has projecting inwardly therefrom at about the middle of the disk-like part, a tapered projection 36 which is availed of for supporting a roll 38 for paper.

Figure 4:
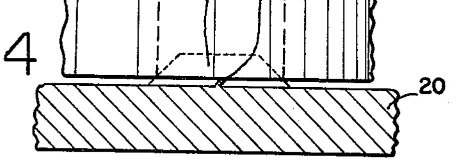
FIGURE 4 is a sectional view indicated by line 4—4 on FIGURE 2 showing a detail of the device according to the present invention.

Additionally, each side member may have a V-shaped projection 40 extending radially thereon from projection 36, which will hold the roll of paper spaced from the said side members, as will be seen in FIGURE 4.

It will be evident that a retaining pin could be employed extending completely through the side members and roll of paper, if desired, but on account of the construction of the device it is possible to employ the aforementioned tapered projections which can be introduced into the ends of a roll of paper by springing the side members apart to introduce the roll of paper therebetween.

The device according to this invention includes a cover member 42 which may be of plastic material or sheet metal and which is adapted for snapping over end members 20, as will best be seen in FIGURE 2. This cover member completely encloses the paper strip except at the side of the roll toward the back edge of the generally transverse surface 44 of the telephone base.

This permits the strip of paper to be drawn from the roll under the front edge of cover member 42 and then up on to the surface 44, as indicated by the dash lines 46 in FIGURE 2.

The cover member 42 has a narrow projection 48 at its front edge on one side which abuttingly engages the base of the telephone, as indicated at 50 in FIGURE 2. This assists in retaining the cover member in place, although its inherent resilience will normally keep it in place on the frame of the device, and also tends to locate the device on the telephone and to prevent accidental movement thereof.

In this connection it will be noted that the region at 50 that is engaged by the projection 48 is tapered downwardly, so that the device will not readily shift on the telephone.

As will be seen in FIGURES 1 and 2, and also in FIGURE 3, the one side member of the device comprises a groove 52 formed therein, through which a ball chain 54 leads having one end member 56 fitting into a recess 58 at the bottom of the groove, so that the ball chain cannot be pulled out from the frame of the device as long as the device is assembled with the telephone and the telephone closes the open side of the groove. This ball chain leads to a writing instrumentality 60 which may be a pencil or a pen, such as a ball point pen.

The present invention also includes a paper guide and tear off element generally indicated at 70, and which is an H-shaped part of plastic or metal, having longitudinally extending side members or rails 72 adapted for being received between the cradle portions 12 of the telephone while engaging the cradle portions, so that the guide member 72 is frictionally retained in position.

A transverse tear off bar 74 extends between the longitudinal rail 72. Each side rail is formed, as will be seen in FIGURE 5, with a notch 76 extending along the inner lower edge. This notch 76 is adapted for receiving the edge of the strip of paper 78 that is leading from roll 38, so that the paper is guided between the notched side rails 72.

FIGURE 5 also shows that the outer face of each side rail 72 is beveled outwardly toward the top as at 80 so that the guide member can be made slightly wider than the distance between the cradle portion 12 of the telephone and then forced downwardly therebetween and the guide member will then be retained in position.

The transversely extending tear off bar 74 is of similar configuration and merely provides a tear off strip so that the paper strip can be torn off at any time.

At the back edge of the side rail 72 which is on the opposite side of the device from the place where the ball chain 54 is anchored, there is a projection 82 having a relatively shallow recess 84 extending laterally across the top thereof.

As will be seen in FIGURE 2 this projection and its recess is availed of for supportingly receiving the point of the writing instrumentality 60, while the other end of the writing instrumentality may rest on the projection 48 previously described, in connection with the cover member 42 and which said projection is, of course, at the opposite side of the device.

In FIGURE 2 it will be noted that the writing instrument nests between the cradle portions 12 and does not interfere with the receiver transmitter of the telephone, and likewise does not interfere with the paper strip.

A feature of the present invention is to be found in connection with a hook-like member 86 carried by the rail member 22 and forming a pocket 88 into which spare cartridges 90 for the writing instrumentality can be detachably retained until it is desired to use them.

In use the paper strip is threaded through the device and whenever the receiver transmitter is lifted from the telephone and, even to a degree, when the receiver transmitter is on the telephone, there is a substantial area of the paper strip at 92 which is available for writing down numbers or short memoranda, or the like, at which time the writing instrumentality 60 can be availed of if so desired.

The paper strip can be readily detached by grasping the end of the strip and pulling it upwardly from one side or the other, whereupon it will tear over the bar portion 75 of the paper guide. Simultaneously with the tearing off of the paper, the paper will tend to advance somewhat, so that at the side of the paper strip that was first torn against the tear off bar there will be an end projecting. This is indicated by the dot-dash outline of the edge of the paper at 94 in FIGURE 1. This is a natural consequence of tearing the paper against the transverse bar. This projecting end, however, can be availed of for advancing the paper strip on upwardly when it is desired to expose more of the paper strip. Should it occur that the tearing of the paper strip extends straight across, the short length of the paper strip disposed behind the transverse tear off bar can be utilized to push the paper forwardly beneath the bar until enough is available to pull the strip on out to the desired position.

The device can be readily detached from the telephone by raising the device at its back end, which will disengage the portion 24 from the finger hole 16 of the telephone, whereupon the entire device, as a single unit can be removed from the telephone. The device can, of course, be assembled within the telephone by carrying these operations out in reverse.

No particular means have been illustrated for affixing the device to the telephone, but it will be apparent that springs or rubber pads, or the like, could be employed, so that a slight force would be required to install the device in the telephone and, conversely, a small force would be required to remove it from the telephone. Something of this nature might take the form of rubber buttons 96 carried by the side members projecting upwardly therefrom and adapted for wedging between the cradle portions of the telephone. Other expedients will occur to those skilled in the art.

It will be understood that this invention is susceptible to modification in order to adapt it to different usages and conditions and accordingly, it is desired to comprehend such modifications within this invention as may fall within the scope of the appended claims.

What is claimed is:

1. A memorandum device for a telephone of the type in which there is a base having a pair of laterally spaced upstanding cradle arms and a hand set adapted for being cradled in said arms, said base having a finger hole extending therein from the back beween said cradle arms, said device comprising; a main frame having means for detachably engaging said finger hole, means for supporting a roll of paper in said main frame so the paper strip can be drawn over the top of the base between said cradle arms, and a tear-off bar on the base extending laterally between said cradle arms in the region toward the rear thereof and beneath which the paper strip passes, said tear-off bar providing an edge against which the paper strip can be torn, said tear-off bar being frictionally retained between said cradle arms by engagement therewith.

2. A memorandum device for a telephone of the type in which there is a base having a pair of laterally spaced upstanding cradle arms and a hand set adapted for being cradled in said arms, said base having a finger hole extending therein from the back between said cradle arms, said device comprising; a main frame having means for detachably engaging said finger hole, means for supporting a roll of paper in said main frame so the paper strip can be drawn over the top of the base between said cradle arms, and paper guide means comprising a generally H-shaped frame having its side legs extending along the insides of said upstanding cradle arms and its transverse leg extending laterally between said side legs toward the rear of said cradle arms, said H-shaped frame frictionally engaging said cradle arms, the said longitudinally extending legs being notched along their lower inner corners to provide guide means for the paper strip and said transverse leg forming a tear-off bar against which the paper strip can be torn off.

3. A memorandum device for a telephone of the type in which there is a base having a pair of laterally spaced upstanding cradle arms and a hand set adapted for being cradled in said arms, said base having a finger hole extending therein from the back between said cradle arms, said device comprising; a main frame having means for detachably engaging said finger hole, means for supporting a roll of paper in said main frame so the paper strip can be drawn over the top of the base between said cradle arms, and paper guide means comprising a generally H-shaped frame having its side legs extending along the insides of said upstanding cradle arms and its transverse leg extending laterally between said side legs toward the rear of said cradle arms, said H-shaped frame frictionally engaging said cradle arms, the said longitudinally extending legs being notched along their lower inner corners to provide guide means for the paper strip and said transverse leg forming a tear-off bar against which the paper strip can be torn off, said main frame comprising a transverse rail resting on the base of the telephone and side members upstanding from opposite ends thereof, said roll of paper being detachably supported by said side members, and a resilient cover member engaging said side members and enclosing the space therebetween which receives the said paper roll.

4. A memorandum device for a telephone of the type in which there is a base having a pair of laterally spaced upstanding cradle arms and a hand set adapted for being cradled in said arms, said base having a finger hole extending therein from the rack between said cradle arms, said device comprising; a main frame having means for detachably engaging said finger hole, means for supporting a roll of paper in said main frame so the paper strip can be drawn over the top of the base between said cradle arms, and paper guide means comprising a generally H-shaped frame having its side legs extending along the insides of said upstanding cradle arms and its transverse leg extending laterally between said side legs toward the rear of said cradle arms, said H-shaped frame frictionally engaging said cradle arms, the said longitudinally extending legs being notched along their lower inner corners to provide guide means for the paper strip and said transverse leg forming a tear-off bar against which the paper strip can be torn off, said main frame comprising a transverse rail resting on the base of the telephone and side members upstanding from opposite ends thereof, said roll of paper being detachably supported by said side members, and a resilient cover member engaging said side members and enclosing the space therebetween which receives the said paper roll, said side members including projecting portions that extend into said finger hole for retaining the main frame on the telephone.

5. A memorandum device for a telephone of the type in which there is a base having a pair of laterally spaced upstanding cradle arms and a hand set adapted for being cradled in said arms, said base having a finger hole extending therein from the back between said cradle arms, said device comprising a frame including a transverse rail resting on the base of the telephone and side members upstanding from opposite ends of said rail, said side members having portions projecting forwardly into said finger hole to retain the frame on the base of the telephone, said finger hole having a dependent ridge at its outer edge across the top, said projecting portions having upstanding parts engaging said ridges, means for rotatably supporting a paper roll between said side members, a cover member detachably mounted on said side members and enclosing the paper roll, an H-shaped frame disposed on the base between said cradle arms, the longitudinal legs of said H-shaped frame being notched to engage and guide the side edges of the strip of paper, the transverse leg of said H-shaped frame being disposed adjacent the rear of said cradle arms and forming a tear-off bar for the paper strip, and a writing instrumentality detachably carried by said device.

6. A memorandum device for a telephone of the type in which there is a base having a pair of laterally spaced upstanding cradle arms and a hand set adapted for being cradled in said arms, said base having a finger hole extending therein from the back between said cradle arms, said device comprising a frame including a transverse rail resting on the base of the telephone and side members upstanding from opposite ends of said rail, said side members having portions projecting forwardly into said finger hole to retain the frame on the base of the telephone, said finger hole having a dependent ridge at its outer edge across the top, said projecting portions having upstanding parts engaging said ridges, means for rotatably supporting a paper roll between said side members, a cover member detachably mounted on said side members and enclosing the paper roll, an H-shaped frame disposed on the base between said cradle arms, the longitudinal legs of said H-shaped frame being notched to engage and guide the side edges of the strip of paper, the transverse leg of said H-shaped frame being disposed adjacent the rear of said cradle arms and forming a tear-off bar for the paper strip, one of said side members having a lateral recess, a flexible element having one end retained in the recess, and a writing instrumentality connected to the other end of said flexible element, said writing instrumentality in length and diameter being receivable between the front edge of said cover and the base of the telephone at the rear portion over which the paper strip is fed.

7. A memorandum device for a telephone of the type in which there is a base having a pair of laterally spaced upstanding cradle arms and a hand set adapted for being cradled in said arms, said base having a finger hole extending therein from the back between said cradle arms, said device comprising a frame including a transverse rail resting on the base of the telephone and side members upstanding from opposite ends of said rail, said side members having portions projecting forwardly into said finger hole to retain the frame on the base of the telephone, said finger hole having a dependent ridge at its outer edge across the top, said projecting portions having upstanding parts engaging said ridges, means for rotatably supporting a paper roll between said side members, a cover member detachably mounted on said side members and enclosing the paper roll, an H-shaped frame disposed on the base between said cradle arms, the longitudinal legs of said H-shaped frame being notched to engage and guide the side edges of the strip of paper, the transverse leg of said H-shaped frame being disposed adjacent the rear of said cradle arms and forming a tear-off bar for the paper strip, one of said side members having a lateral recess, a flexible element having one end retained in the recess, and a writing instrumentality connected to the other end of said flexible element, said writing instrumentality in length and diameter being receivable between the front edge of said cover and the base of the telephone at the rear portion over which the paper strip is fed, said cover and said H-shaped frame comprising portions projecting into the space for receiving the writing instrumentality and providing support means for supportedly engaging opposite ends of the writing instrumentality.

8. A memorandum device according to claim 7 in which the writing instrumentality is a ball point pen having a detachable cartridge and said transverse rail has compartment means formed thereon for receiving replacement cartridges for the writing instrumentality.

9. A memorandum device for a telephone of the type in which there is a base having a pair of laterally spaced upstanding cradle arms and a hand set adapted for being cradled in said arms, said base having a finger hole extending therein from the back between said cradle arms, said device comprising; a main frame having means for detachably engaging said finger hole, means for supporting a roll of paper in said main frame so the paper strip can be drawn over the top of the base between said cradle arms, and paper guide means comprising a generally H-shaped frame having its side legs extending along the insides of said upstanding cradle arms and its transverse leg extending laterally between said side legs toward the rear of said cradle arms, said H-shaped frame frictionally engaging said cradle arms, the said longitudinally extending legs being notched along their lower inner corners to provide guide means for the paper strip and said transverse leg forming a tear-off bar against which the paper strip can be torn off, said main frame comprising a transverse rail resting on the base of the telephone and side members upstanding from opposite ends thereof, said roll of paper being detachably supported by said side members, and a resilient cover member engaging said side members and enclosing the space therebetween which receives the said paper roll, said side members including projection portions that extend into said finger hole for retaining the main frame on the telephone, said main frame including means resiliently engaging said base of the telephone under pressure for firmly but detachably retaining the device in assembled relation with the telephone base.

10. A memorandum device for a telephone of the type in which there is a base having a pair of laterally spaced upstanding cradle arms and a hand set adapted for being cradled in said arms, said base having a finger hole extending therein from the back between said cradle arms, said device comprising; a main frame having means for detachably engaging said finger hole, means for supporting a roll of paper in said main frame so the paper strip can be drawn over the top of the base between said cradle arms, and paper guide means and tear-off means detachably mounted on said base between said cradle arms for guiding said paper strip and also providing an edge against which the paper strip can be torn off, said means for supporting the roll of paper in said main frame comprising tapered projections extending inwardly from opposite sides of said main frame adapted for engaging the center hole in said paper roll.

11. A memorandum device for a telephone of the type in which there is a base having a pair of laterally spaced upstanding cradle arms and a hand set adapted for being cradled in said arms, said base having a finger hole extending therein from the back between said cradle arms, said device comprising; a main frame having means for detachably engaging said finger hole, means for supporting a roll of paper in said main frame so that paper strip can be drawn over the top of the base between said cradle arms, and paper guide means and tear-off means detachably mounted on said base between said cradle arms for guiding said paper strip and also providing an edge against which the paper strip can be torn off, said means for supporting the roll of paper in said main frame comprising tapered projections extending inwardly from opposite sides of said main frame adapted for engaging the center hole in said paper roll, the said opposite ends of said main frame including rib means extending radially from said projections and providing regions for engaging and centering the paper roll for retaining a reduced area of contact therewith.

12. A memorandum device for a telephone of the type in which the transmitter-receiver of the telephone is cradled on the base of the telephone on spaced upstanding cradle arms, said base having a finger hole extending therein from the back between said cradle arms, said device comprising; a main frame having side members for detachably engaging said finger hole, paper roll supporting means positioned on said side members, and an H-shaped frame detachably mounted on said base between said cradle arms, said H-shaped frame having paper guide means and paper tear off means thereon.

13. A memorandum device for a telephone of the type in which the transmitter-receiver of the telephone is cradled on the base of the telephone on spaced upstanding cradle arms, said base having a finger hole extending therein from the back between said cradle arms, said device comprising; a main frame having side members for detachably engaging said finger hole, paper roll supporting means positioned on said side members and a roll of paper mounted thereon with a strip of paper from said roll drawn over the top of the base between said cradle arms, and an H-shaped frame detachably mounted on said base between said cradle arms, said H frame having paper guide means and paper tear off means thereon.

References Cited in the file of this patent

UNITED STATES PATENTS

| | | |
|---|---|---|
| 2,414,597 | Higbee | Jan. 21, 1947 |
| 2,610,867 | Hamilton | Sept. 16, 1952 |
| 3,003,791 | Madding | Oct. 10, 1961 |